(12) United States Patent
Sasaki

(10) Patent No.: US 9,170,395 B2
(45) Date of Patent: Oct. 27, 2015

(54) LENS APPARATUS, OPTICAL APPARATUS AND CAMERA

(71) Applicant: CANON KABUSHIKI KAISHA, Tokyo (JP)

(72) Inventor: Kunihiko Sasaki, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/312,050

(22) Filed: Jun. 23, 2014

(65) Prior Publication Data

US 2014/0375868 A1 Dec. 25, 2014

(30) Foreign Application Priority Data

Jun. 25, 2013 (JP) .................................. 2013-132527
May 12, 2014 (JP) .................................. 2014-098547

(51) Int. Cl.
| | |
|---|---|
| G03B 17/00 | (2006.01) |
| G02B 7/10 | (2006.01) |
| H04N 5/225 | (2006.01) |
| G02B 15/163 | (2006.01) |

(52) U.S. Cl.
CPC ................ G02B 7/10 (2013.01); H04N 5/2254 (2013.01); G02B 15/163 (2013.01)

(58) Field of Classification Search
USPC .............................. 396/72, 529; 359/819, 822
See application file for complete search history.

(56) References Cited

U.S. PATENT DOCUMENTS 4,989,950 A * 2/1991 Nakauchi ...................... 359/818

FOREIGN PATENT DOCUMENTS

| JP | 2009-042345 A | 2/2009 |
| JP | 2010-197698 A | 9/2010 |

OTHER PUBLICATIONS

JP-2010-197698 Machine Translation available from JPO website.*

* cited by examiner

*Primary Examiner* — Minh Phan
(74) *Attorney, Agent, or Firm* — Rossi, Kimms & McDowell LLP

(57) ABSTRACT

The lens apparatus allows adjustment of lens tilt due to component variation caused by tolerance. The lens barrel includes a straight guiding barrel having a straight groove portion, a cam barrel having a cam groove portion, a straight movable barrel disposed outside the straight guiding and cam barrels, holding a lens and being movable in an optical axis direction by a relative movement of the straight guiding and cam barrels. A cam follower includes first and second cylindrical portions that respectively engage with the straight groove and cam groove portions. The first and second cylindrical portions have central axes decentered from each other. The cam follower includes an operation portion allowing rotational operation of the first and second cylindrical portions from outside of the straight movable barrel. A connecting member connects the cam follower and the straight movable barrel with each other.

13 Claims, 4 Drawing Sheets

LENS APPARATUS, OPTICAL APPARATUS AND CAMERA

BACKGROUND OF THE INVENTION

1. Field of the Invention

The present invention relates to a lens apparatus and an optical apparatus including the same.

2. Description of the Related Art

In a conventionally known configuration, a cam barrel and a straight guiding barrel are relatively moved to move a lens holding barrel in an optical axis direction. Specifically, Japanese Patent Laid-open No. 2009-42345 discloses a configuration including a cam barrel in which cam groove portions are formed at multiple circumferential positions, a straight guiding barrel in which straight groove portions are formed at multiple circumferential positions and a straight movable barrel holding a lens. In this configuration, cam followers are mounted to the straight movable barrel; each cam follower includes a roller portion (cylindrical portion) engaging with the cam groove portion of the cam barrel and a key portion engaging with a straight groove portion of the straight guiding barrel, and thereby the straight movable barrel is moved in the optical axis direction.

In Japanese Patent Laid-open No. 2009-42345, the straight movable barrel is disposed outside the cam barrel and the straight guiding barrel, and each cam follower is pulled by a screw toward the straight movable barrel to be fixed thereto. Such a configuration causes decentering and tilt in which the lens held by the straight movable barrel serving as a lens holding barrel is shifted from an ideal position on the optical axis because of manufacturing accuracy (tolerance) of each component, thereby degrading optical performance.

The shape of the cam groove portion formed in the cam barrel is set depending on a movement locus of a lens unit for zooming or focusing. Some lens configurations have a so-called U-turn cam in which a positive and negative sign of an angle (intersection angle) formed by the cam groove portion with the straight groove portion changes between a wide-angle side and a telephoto side or between an infinity side and a close side.

For example, an angular position tolerance (equal division difference) of the cam groove portions in the cam barrel and of the straight groove portions in the straight guiding barrel causes engagement of the cam followers with the cam groove and straight groove portions at positions shifted from ideal engagement positions, thereby causing tilt and decentering of the straight movable barrel. In particular, in the straight movable barrel moved by the above-mentioned U-turn cam, the intersection angle inverts between the wide-angle side and the telephoto side or between the infinity side and the close side, so that the direction of the tilt also inverts therebetween, resulting in a larger change amount of the tilt.

For such a lens unit affecting degradation of optical performance, decentering adjustment and tilt adjustment of the lens unit are typically performed taking the optical performance as an evaluation item. In the case of including the U-turn cam, however, when the decentering adjustment and the tilt adjustment of the lens unit are performed to improve optical performance at, for example, the telephoto side or the infinity side, the optical performance can be improved at the telephoto side or the infinity side, but an opposite tilt is caused at the wide-angle side or the close side. This results in greater degradation in optical performance than that caused in a case of using a normal cam groove portion which is not the U-turn cam.

Thus, in the case of including the U-turn cam, the change in the intersection angle due to the U-turn cam in adjusting the optical performance by adjustment of any one of the lens units or all of the lens units causes a significant degradation in the optical performance.

Therefore, for example, correcting variation due to the equal division difference of the straight groove portions and the cam groove portions enables suppressing the change in tilt due to the U-turn cam. For example, as a well-known technique, decentering the roller portion (cylindrical portion) engaging with the cam groove portion of the cam barrel with respect to the key portion engaging with the straight groove portion of the straight guiding barrel enables adjusting a circumferential shift caused by the equal division difference.

Japanese Patent Laid-open No. 2010-197698 discloses an easy-to-assemble lens barrel configuration with cam followers each including a first cylindrical portion (engaging with a cam groove portion and a straight guiding groove portion) and a second cylindrical portion (engaging with a cam follower position controlling portion of a straight movable barrel).

In the straight movable barrel as the lens holding barrel disclosed in Japanese Patent Laid-open No. 2009-42345, however, the cam follower is pulled by the screw toward the straight movable barrel to be fixed thereto, which makes it difficult to adjust the cam follower and thus makes it difficult to adjust the equal division difference.

Moreover, the configuration disclosed in Japanese Patent Laid-open No. 2010-197698 allows suppressing the change in tilt due to assembly variation, but does not allow suppressing the change in tilt due to component variation.

SUMMARY OF THE INVENTION

The present invention provides a lens apparatus allowing adjustment to suppress change in tilt due to component variation caused by tolerance while having a configuration in which a straight movable barrel is disposed outside a straight guiding barrel and a cam barrel, and provides an optical apparatus including the lens apparatus.

The present invention provides as an aspect thereof a lens apparatus including a straight guiding barrel in which a straight groove portion is formed, a cam barrel in which a cam groove portion is formed, a straight movable barrel disposed outside the straight guiding barrel and the cam barrel, holding a lens and being movable in an optical axis direction by a relative movement of the straight guiding barrel and the cam barrel, a cam follower including a first cylindrical portion and a second cylindrical portion that respectively engage with the straight groove portion and the cam groove portion, the first and second cylindrical portions having central axes decentered from each other, and the cam follower including an operation portion allowing rotational operation of the first and second cylindrical portions from outside of the straight movable barrel, and a connecting member connecting the cam follower and the straight movable barrel with each other.

The present invention provides as other aspects thereof an optical apparatus and a camera including the above lens apparatus.

Further features of the present invention will become apparent from the following description of exemplary embodiments (with reference to the attached drawings).

DESCRIPTION OF THE EMBODIMENTS

Exemplary embodiments of the present invention will be described below in detail with reference to the accompanied drawings.

(Camera)

Figure 4:
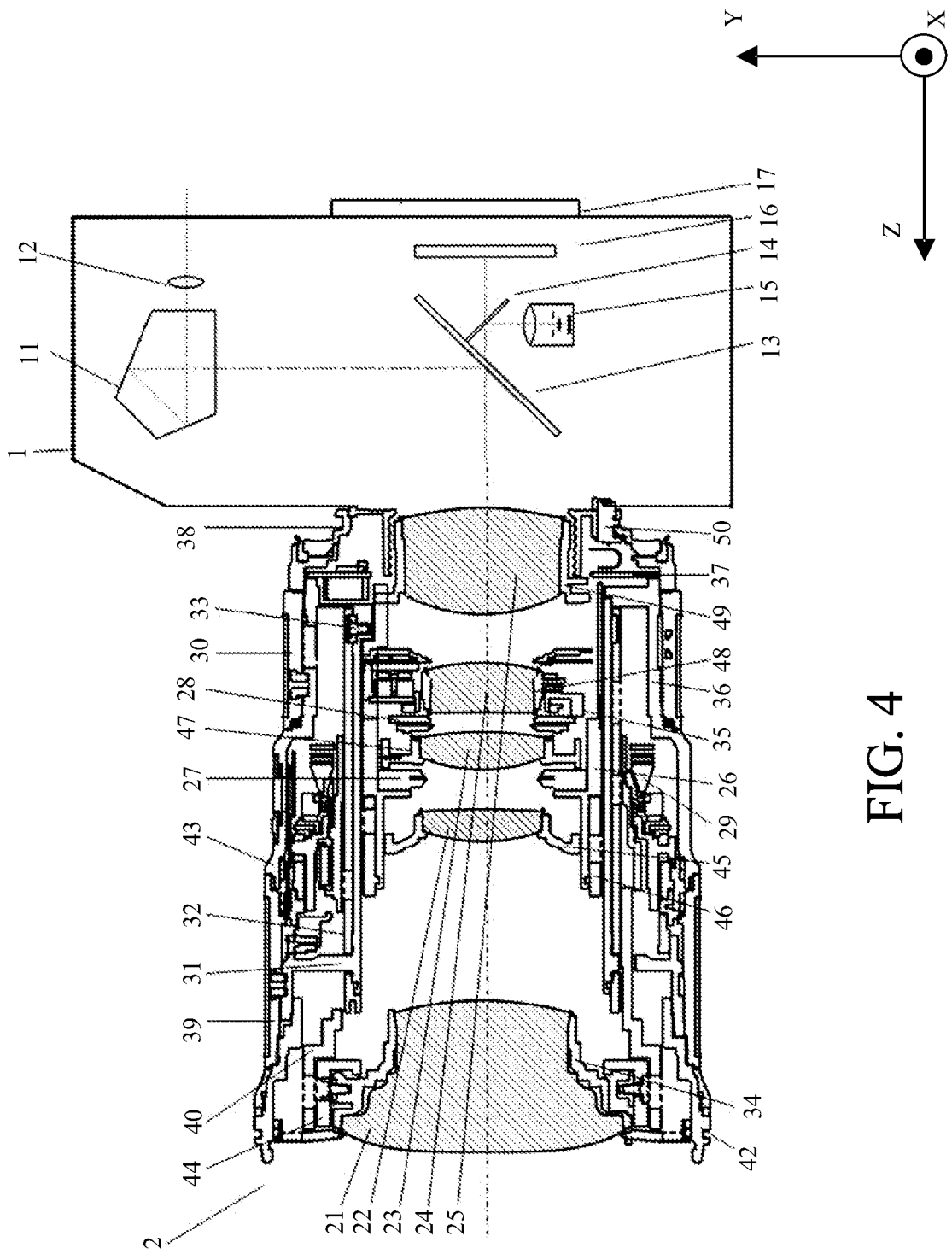
FIG. 4 is a cross-sectional view of an interchangeable lens as an optical apparatus and a lens-interchangeable digital single-lens reflex camera to which the interchangeable lens is mounted.

FIG. 4 is a cross-sectional view illustrating an interchangeable lens as an optical apparatus which includes therein a lens barrel (lens apparatus) that is an embodiment of the present invention. FIG. 4 also illustrates a lens-interchangeable digital single-lens reflex camera as an image pickup apparatus to which the interchangeable lens is mounted. In FIG. 4, a direction of an optical axis of the interchangeable lens (an image capturing optical axis of the camera) is taken to be a Z direction. Of two directions orthogonal to the optical axis and parallel to an image capturing surface, one perpendicular to the sheet of FIG. 4 is taken to be an X direction, and the other that is a vertical direction in FIG. 4 is taken to be a Y direction.

Reference numeral 1 denotes a camera body as a camera apparatus (hereinafter simply referred to as "a camera"), and reference numeral 2 denotes the interchangeable lens as the lens barrel mounted to the camera 1. The configuration of the camera 1 will be described first. In a state illustrated in FIG. 4, a main mirror 13 is disposed on an optical path of light from the interchangeable lens 2 to reflect part of the light to a finder optical system (11 and 12) and transmit the rest of the light. A sub mirror 14 is disposed behind the main mirror 13 to reflect the light transmitted through the main mirror 13 to a focus detection unit 15. The main mirror 13 and the sub mirror 14 are retractable from the optical path by a drive mechanism (not illustrated).

The focus detection unit 15 includes an autofocus (AF) sensor and has a function of performing focus detection (detection of a focus state of the interchangeable lens 2) by a so-called phase difference detection method. The AF sensor includes a separator lens that divides entering light into two light fluxes, two condenser lenses that causes the respective divided light fluxes to reform optical images of an object, and line sensors such as CCD sensors that convert the two optical images (object images) into electric signals. Each line sensor is formed in a cross shape to detect positions of the object image in the vertical direction (Y direction) and a horizontal direction corresponding to the X direction.

Reference numeral 16 denotes an image sensor configured by a CCD sensor or a CMOS sensor. The image sensor 16 has a light-receiving surface (image capturing surface) on which an object image is formed by the light from the interchangeable lens 2 and photoelectrically converts the object image (optical image) formed through the lens barrel. The image sensor 16 converts the object image to an electric signal output it as an image capturing signal. The camera 1 includes an electrically-controlled focal plane shutter (not illustrated) that controls exposure of the image sensor 16. The finder optical system includes a penta prism 11 and an eyepiece lens 12. Reference numeral 17 denotes a display panel that has a function of displaying an image output from a signal processor (not illustrated) that receives the image capturing signal from the image sensor 16 and displaying other various kinds of image capturing information.

(Interchangeable Lens)

The interchangeable lens 2 is a so-called wide-angle zoom lens including, in order from the object side to an image side, a first lens unit 21, a second lens unit 22, a third lens unit 23, a fourth lens unit 24 and a fifth lens unit 25. The second lens unit serves as a focus lens unit, and the fourth lens unit serves as an image stabilizing (image blur correcting) lens unit. The second lens unit 22, the third lens unit 23 and the fifth lens unit 25 are mounted to a lens unit base 26 and are moved integrally for zooming.

An aperture stop unit 27 is disposed on an object side further than the third lens unit 23, and a sub aperture stop unit 28 is disposed on the object side further than the fourth lens unit 24. The both aperture stops 27 and 28 control quantity of the light passing through the interchangeable lens 2 to enter the camera 1. The first to fifth lens units 21 to 25, the aperture stop unit 27 and the sub aperture stop unit 28 constitute an image capturing optical system. The second lens unit 22 is moved with the third lens unit 23 and the fifth lens unit 25 for zooming, whereas for focusing, the second lens unit 22 receives drive power from a focus drive unit 29 to be moved on the optical axis, thereby performing focusing.

When a user rotates a zoom operation ring 30 around the optical axis, the drive power is transferred by a transmission mechanism (not illustrated) to move the whole image capturing optical system along a predetermined locus on the optical axis, thereby performing zooming. During zooming, the transmission mechanism (not illustrated) moves the sub aperture stop unit 28 to adjust the light quantity to a predetermined light quantity. The fourth lens unit 24 as the image stabilizing lens unit is driven in an X-Y plane to correct image blur caused by hand jiggling.

(Lens Barrel)

Next, detailed description will be made of the configuration of the lens barrel in the interchangeable lens 2. In FIG. 4, reference numeral 31 denotes a straight guiding barrel (straight guiding member) including three guiding members 33 that prevent a cam barrel (cam member) 32 from moving in a direction of the optical axis (hereinafter referred to as an optical axis direction) and guide rotation of the cam barrel 32 about the optical axis. The straight guiding barrel 31 includes straight groove portions 311, 312 and 313 (312 and 313 are not illustrated), three each, that respectively guide in the optical axis direction a first lens unit holder 34, the lens unit base 26 and an image stabilizing unit base 35. The straight guiding barrel 31 includes cam groove portions (not illustrated) for transferring rotation to the sub aperture stop unit 28 when the image stabilizing unit base 35 is moved.

The cam barrel 32 includes cam groove portions 321, 322 and 323, three each, which respectively guide the first lens unit holder 34, the lens unit base 26 and the image stabilizing unit base 35. The cam barrel 32 rotates about the optical axis by rotational force applied by the user through a key member (not illustrated) that is a rotation transferring member extending from the zoom operation ring 30. The rotational force is converted through the straight groove portions and the cam groove portions to a straight directional force to move the lens units in the optical axis direction.

The straight guiding barrel 31 is fixed to a fixed barrel 36 constituting a lens body by a fixing means such as a screw. The fixed barrel 36 includes a substrate attachment portion to which a main circuit substrate 37 is attached, a mount attachment portion to which a mount 38 is attached and a barrel attachment portion to which an exterior barrel 43 is attached.

The zoom operation ring 30 rotatably engages with the fixed barrel 36 at a fixed position and transfers the rotational force to the cam barrel 32 through the key member. Reference numeral 39 denotes a focus operation ring. The focus operation ring 39 is provided with rollers engaging with a guiding groove portion extending in a circumferential direction of the straight guiding barrel 31 to allow rotation of the focus operation ring 39 about the optical axis. The focus operation ring 39 engages with the focus drive unit 29 to transfer the drive power to the second lens unit 22 as the focus lens unit, whereas the rotational force is not transferred to the focus operation ring 39 when AF is performed. In other words, the focus drive unit 29 includes a so-called full-time manual mechanism.

Reference numeral 40 denotes a straight movable barrel that is disposed outside the straight guiding barrel 31 and the cam barrel 32. The straight movable barrel 40 is moved in the optical axis direction via first lens cam followers 41 provided thereon for the first lens unit 21 along the three straight groove portions 311 (FIG. 1A) formed at circumferentially 120-degree intervals in the straight guiding barrel 31 and the three cam groove portions 321 (FIG. 1A) formed at circumferentially 120-degree intervals in the cam barrel 32. The lens unit base 26 is moved in the optical axis direction via lens base cam followers (not illustrated) provided thereon along the three straight groove portions 312 (not illustrated as described above) formed at circumferentially 120-degree intervals in the straight guiding barrel 31 and the three cam groove portions 322 formed at circumferentially 120-degree intervals in the cam barrel 32. The image stabilizing unit base 35 is moved in the optical axis direction via image stabilizing cam followers (not illustrated) provided thereon along the three straight groove portions 313 (not illustrated as described above) formed at circumferentially 120-degree intervals in the straight guiding barrel 31 and the three cam groove portions 323 formed at circumferentially 120-degree intervals in the cam barrel 32. Each of the cam groove portions 321, 322 and 323 may be formed such that its positive and negative sign of the angle formed with the straight groove portion inverts with change in its engagement position with the cam follower during zooming or focusing.

In FIG. 4, a front frame 42 is fastened and fixed to the straight guiding barrel 31. The front frame 42 includes a screw portion to which an accessory such as a filter is attached and a flange portion to which an accessory such as a hood is attached. The exterior barrel 43 is a cover member ornamentally covering internal components and includes a mode switching portion and a nameplate attachment portion (both not illustrated).

The first lens unit holder 34 that holds the first lens unit 21 is fixed to the straight movable barrel 40 via an adjustment ring 44. The first lens unit 21 is thereby held by the straight movable barrel in effect. The adjustment ring 44 includes an adjustment configuration (not illustrated) that allows decentering adjustment in the X-Y plane with respect to the straight movable barrel 40 so as to achieve optimum optical performance. The adjustment ring 44 and the first lens unit holder 34 are each provided with a so-called end face cam such that the first lens unit holder 34 is movable in the optical axis direction with respect to the adjustment ring 44. Rotating the end face cam about the optical axis enables adjusting the position of the first lens unit holder 34 in the optical axis direction to a position where optimum optical performance is achieved.

Reference numeral 45 denotes a second lens unit holder. Rotation of a focus cam barrel 46 by the drive power from the focus drive unit 29 with respect to the lens unit base 26 drives the second lens unit holder 45 in the optical axis direction via focus cam followers (not illustrated). Reference numeral 47 denotes a third lens unit holder. The third lens unit holder 47 is attached to the lens unit base 26 via a decentered roller (not illustrated) such that decentering adjustment of third lens unit holder 47 in the X-Y plane is allowed.

Reference numeral 48 denotes a fourth lens unit holder. The fourth lens unit holder 48 includes a shiftable barrel that can be shifted in the X-Y plane with the image stabilizing unit base 35 to perform image stabilization and includes a drive member that drives the shiftable barrel. The image stabilizing unit base 35 is held via the image stabilizing cam followers by the straight groove portions 313 and the cam groove portions 323. The fourth lens unit holder 48 further includes a holding portion that holds the second lens unit 22. Reference numeral 49 denotes a fifth lens unit holder. The fifth lens unit holder 49 is attached to the lens unit base 26 via a decentered roller (not illustrated) such that decentering adjustment of the fifth lens unit holder 49 in the X-Y plane is allowed.

The mount member 38 includes a flange portion for attachment to the camera 1. The focus drive unit 29 rotates the focus cam barrel 46 about the optical axis. Reference numeral 50 denotes a contact member that includes a lens contact portion whose one end is connected to the main circuit substrate 37. The lens contact portion makes contact with a camera contact portion provided in the camera 1 when the mount member 38 is coupled to the camera 1 and thereby transfers information to and from the camera 1.

In the lens barrel thus configured, in response to an operation of a release button (not illustrated), the AF and an exposure decision are performed, and thereafter exposure of the image sensor 16 and recording of a captured image are performed.

(Mutual Relation of Main Components)

Figure 2A:
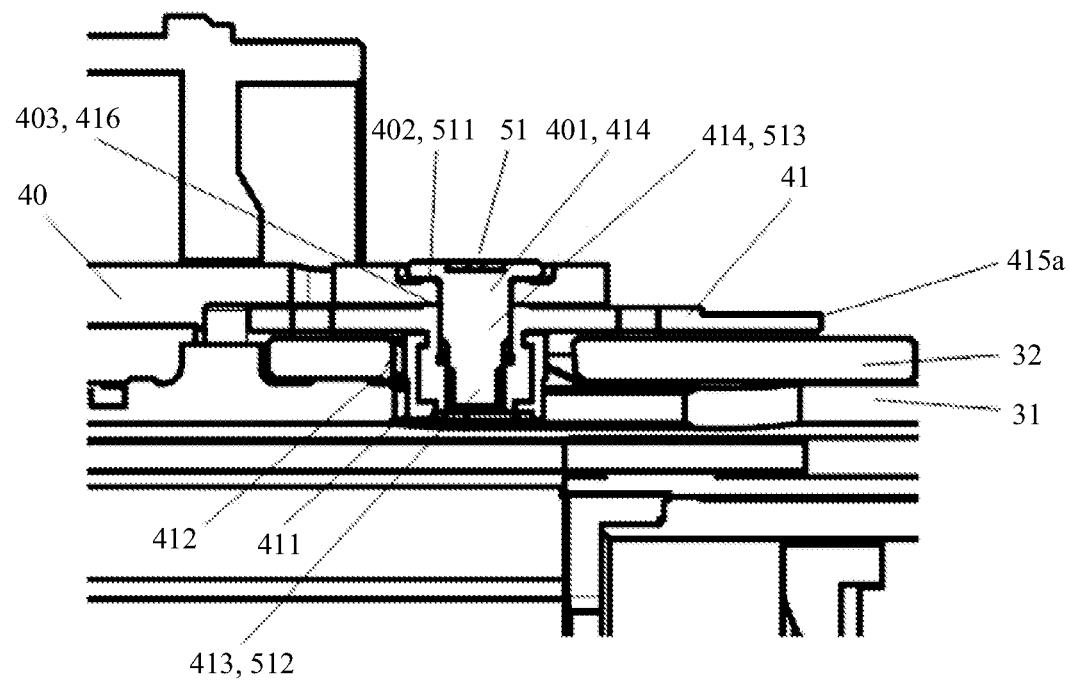
FIG. 2A is a cross-sectional view of a main part of the lens barrel of the embodiment.
Figure 2B:
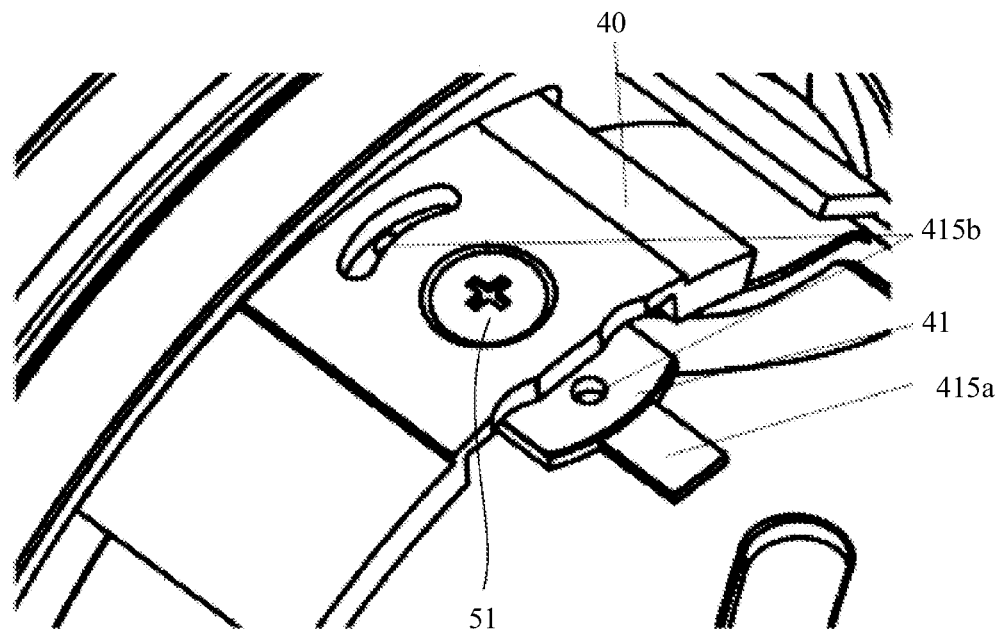
FIG. 2B is an enlarged perspective view of the main part of the lens barrel of the embodiment.
Figure 2C:
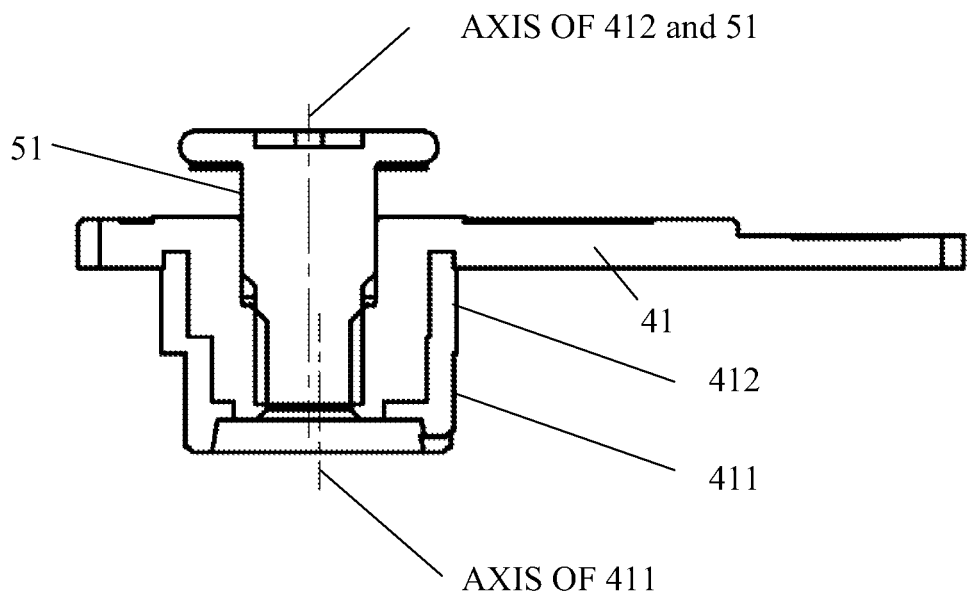
FIG. 2C is a cross-sectional view (enlarged view) of the main part of the lens barrel of the embodiment.

Next, description will be made of the mutual relation of main components in the present embodiment. FIG. 2B is an enlarged perspective diagram of part of the lens barrel configuration, illustrating the straight movable barrel 40, the first lens cam follower 41 and a connecting member 51 that fastens and couples the straight movable barrel 40 and the first lens cam follower 41 to each other. FIG. 2B only illustrates components necessary to facilitate understanding. FIG. 2A is a cross-sectional view of the same part illustrated in FIG. 2B. FIG. 2C is an enlarged cross-sectional view of the first lens cam follower 41 and the connecting member 51.

In FIG. 2A, the first lens cam follower 41 includes a first cylindrical portion 411 engaging with the straight groove portion 311 of the straight guiding barrel 31 and a second cylindrical portion 412 engaging with the cam groove portion 321 of the cam barrel 32. The first lens cam follower 41 further includes a fixing portion 413 to which the connecting member 51 is fixed, a positioning portion 414 that positions the connecting member 51 with respect to the first lens cam follower 41, exposed portions (operation portions) 415a and 415b that are exposed outside the straight movable barrel 40 and are operable with tools from the outside after installation, and a contact portion 416 that makes contact with the straight movable barrel 40. The exposed portions 415a and 415b as the operation portions allow an operation of rotating the first cylindrical portion 411 and the second cylindrical portion 412 from outside of the straight movable barrel 40. The first lens cam follower 41 has these portions 413, 414, 415a and 415b integrally formed therewith.

In the present embodiment, the first cylindrical portion 411 and the second cylindrical portion 412 are formed of a plastic material such as polyoxymethylene (POM), whereas the other components are formed of a highly rigid material such as metal. The cylindrical portions 411 and 412 are coupled with the other components by so-called insert molding. The second cylindrical portion 412 located farther from the optical axis and the connecting member 51 have center axes (rotation axes) that coincide with each other. In contrast, as illustrated in FIG. 2C, a cylinder center axis L411 of the first cylindrical portion 411 located closer to the optical axis does not coincide with a cylinder center axis (rotation axis) L412 of the second cylindrical portion 412. In other words, the first cylindrical portion 411 has a cylinder center axis decentered with respect to that of the second cylindrical portion 412.

The connecting member 51 includes a pulling portion 511 for fastening the first lens cam follower 41 to the straight movable barrel 40 with pulling of the first lens cam follower 41 toward the straight movable barrel 40, a fixing portion 512 for fixing the first lens cam follower 41, and a positioning portion 513 for positioning the first lens cam follower 41 and the straight movable barrel 40.

The straight movable barrel 40 includes a positioning portion (hole portion) 401 for positioning the connecting member 51, a contact portion 402 that makes contact with the pulling portion 511 of the connecting member 51, and a cam follower contact portion (fixing portion) 403 that makes contact with the first lens cam follower 41. The connecting member contact portion 402 of the straight movable barrel 40 has a limited contact surface making contact with the connecting member 51 in its limited area to reduce a rotational load in adjustment using the first lens cam follower 41 described later. Similarly to the connecting member contact portion 402, the contact portion 416 of the first lens cam follower 41 has a limited contact surface making contact with the straight movable barrel 40.

(Installation)

Figure 1A:
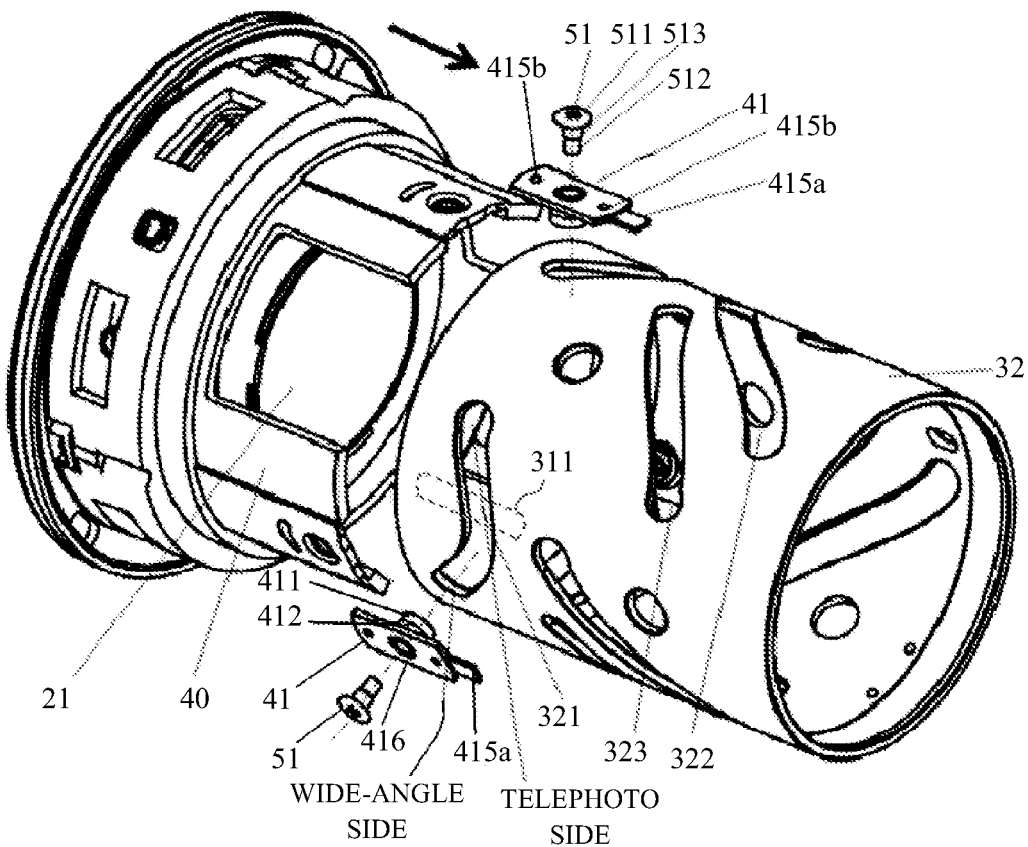
FIG. 1A is an exploded perspective view of a lens barrel (lens apparatus) that is an embodiment of the present invention.

FIG. 1A is an exploded perspective diagram of the configuration described above. Other components including the straight guiding barrel 31 are omitted in the figure to facilitate understanding. At installation, the first lens cam follower 41 is set from the outside so that the first cylindrical portion 411 and the second cylindrical portion 412 of the first lens cam follower 41 engage with the straight groove portion 311 and the cam groove portion 321. The straight movable barrel 40 is then slid to set in a direction shown by an arrow in FIG. 1A. After that, the connecting member 51 is inserted into the positioning portion 401 of the straight movable barrel 40 and into the positioning portion 414 of the first lens cam follower 41, and the first lens cam follower 41 is installed at its fixing portion 413 to the fixing portion 512 of the connecting member 51.

After the installation, the first lens cam follower 41 has the limited contact surface making contact with the straight movable barrel 40 as described above. Therefore, the first lens cam follower 41 is rotatable about the cylinder center axis (rotation axis) of the second cylindrical portion 412 as described later, and the position of the straight movable barrel 40 is adjustable in its circumferential direction with respect to the straight groove portions 311. After an adjustment described later, the straight movable barrel 40 and the cam followers 41 are fixed with a fixing means (not illustrated) so as not to relatively rotate. In the present embodiment, the fixation is performed using an adhesive. The straight groove portions 311, the cam groove portions 321, the first lens cam followers 41, the connecting members 51 and the straight movable barrel 40 constitute an adjustment mechanism.

(Adjustment)

Next, description will be made of a method of adjustment of component tolerance in the circumferential direction of the straight movable barrel 40. In the first lens cam follower 41, as described above, the first cylindrical portion 411 engaging with the straight groove portion 311 is decentered with respect to the second cylindrical portion 412 engaging with the cam groove portion 321. The exposed portions 415a and 415b of the first lens cam follower 41 that are exposed outside the straight movable barrel 40 after the installation are rotatable about the cylinder center axis of the second cylindrical portion 412 by a rotation operation using tools (not illustrated).

Figure 1B:
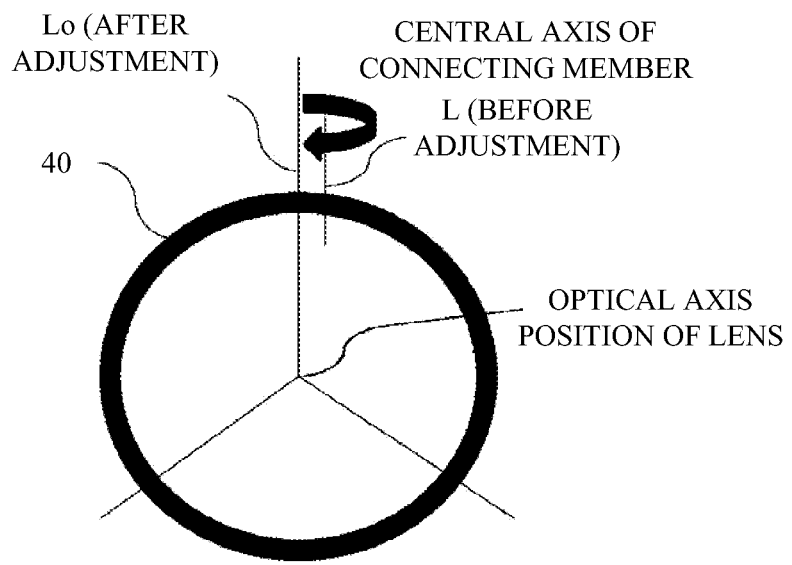
FIG. 1B is a conceptual diagram of equal division difference adjustment for the lens barrel viewed in an optical axis direction.
Figure 3:
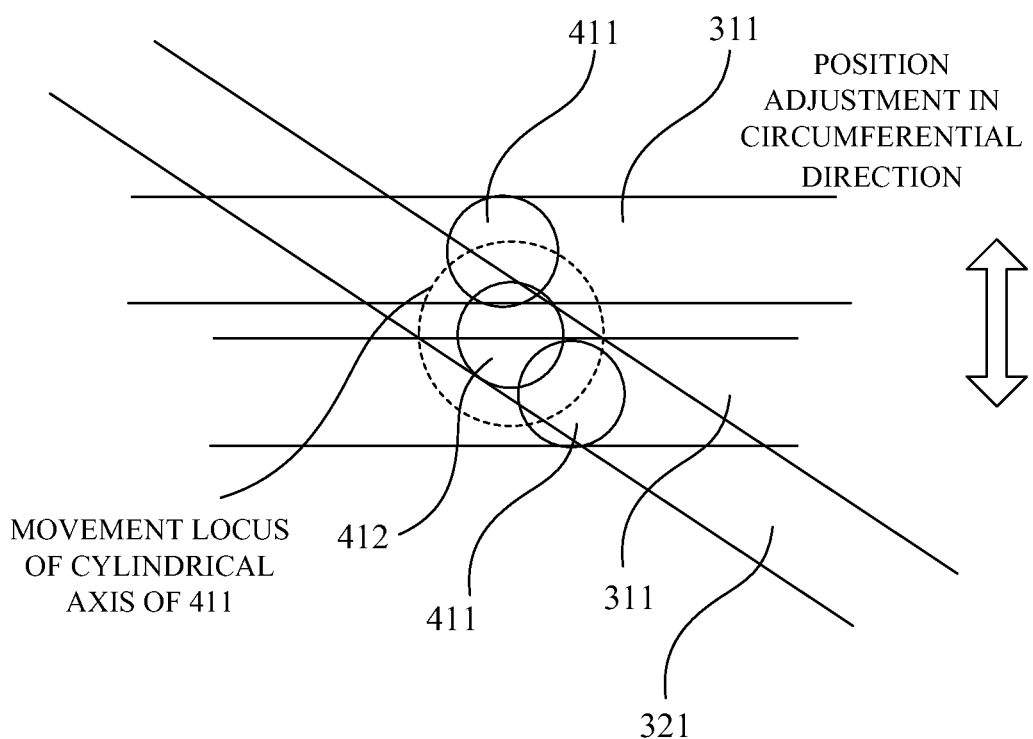
FIG. 3 is a conceptual diagram of the equal division difference adjustment viewed from an outer circumferential side of the lens barrel of the embodiment.

This rotation operation revolves the first cylindrical portion 411 (disposed closer to the lens optical axis than the second cylindrical portion 412) about the cylinder center axis of the second cylindrical portion 412 (disposed farther from the lens optical axis than the first cylindrical portion 411 and having the common center axis with the connecting member 51) as shown in FIGS. 1B and 3. That is, the first cylindrical portion 411 is rotated about the cylinder center axis (rotation axis) of the second cylindrical portion 412. This allows a circumferential directional shift of the straight movable barrel 40 with respect to the straight groove portion 311 engaging with the first cylindrical portion 411.

FIG. 3 illustrates, by two of the first cylindrical portion 411 and two of the straight groove portion 311, revolution of the first cylindrical portion 411 and a circumferential directional shift therewith of the second cylindrical portion 412 (that is, of the straight movable barrel 40) with respect to the straight groove portion 311. FIG. 3 also illustrates, by a dotted line, a movement locus of the cylinder center axis of the first cylindrical portion 411 in the revolution thereof.

This configuration enables, even if the multiple straight groove portions 311 are unequally spaced with some error in the circumferential direction of the straight guiding barrel 31 due to component tolerance, an adjustment of the component tolerance. Specifically, moving the straight movable barrel 40 with respect to the straight groove portions 311 in the circumferential direction enables an adjustment of decentering of the straight movable barrel 40 due to the component tolerance.

In this manner, the component tolerance of the straight movable barrel 40 can be adjusted in the circumferential direction.

As for a specific extent of the adjustment, the adjustment uses a mirror provided at an object side end of the straight movable barrel 40 and is performed so as to reduce a difference between the wide-angle side and the telephoto side in the position of a reflected light of light projected onto the mirror. In this case, the position of the reflected light is an index indirectly indicating tilt of the straight movable barrel 40.

The cam groove portion 321 which is used to move the straight movable barrel 40 is formed as the U-turn cam, as illustrated in FIG. 1A, so as to move the straight movable barrel 40 to the image side from an end of the telephoto side (telephoto end) to a middle zoom position and then move the straight movable barrel 40 to the object side from the middle zoom position to an end of the wide-angle side (wide-angle end). Thereby, the component tolerance increases variation in the tilt of the first lens unit 21 between the wide-angle side and the telephoto side, which significantly degrades optical performance. Accordingly, the adjustment of the component tolerance in the present embodiment is highly effective.

The component tolerance mentioned here is not limited to the equal division difference of the positioning portion 401 of the straight movable barrel 40; it includes the equal division difference (angle tolerance) of the straight groove portions 311, the equal division difference of the cam groove portions 321, a tolerance relating to backlash in positioning of each of the connecting member 51 and the first lens cam follower 41, and a tolerance relating to a concentricity between the positioning portion 414 and each of the cylindrical portions 411 and 412 of the first lens cam follower 41. The component tolerance further includes a tolerance relating to squareness of the cylindrical portion 411 and that of the positioning portion 414 of the first lens cam follower 41 with respect to the contact portion 416 thereof, and squareness of the positioning portion 513 of the connecting member 51 with respect to the pulling portion 511 thereof.

MODIFIED EXAMPLE 1

Although the above embodiment described the case where the straight guiding barrel is provided on a side closer to the optical axis and the cam barrel is provided outside the straight guiding barrel, alternative embodiments of the present invention are not limited thereto and include a configuration having an opposite arrangement of the straight guiding barrel and the cam barrel. In this configuration, the cam barrel in which the cam groove portions (321) are formed is provided on a side closer to the optical axis, the straight guiding barrel (31) in which the straight groove portions (311) are formed is provided outside the cam barrel, and the straight movable barrel (40) holding the lens and being movable in the optical axis direction by the relative movement of the straight guiding and cam barrels is provided outside the straight guiding and cam barrels.

The shape of the cylindrical portion of the cam follower is not limited to a cylindrical shape and may be any other shape as long as the effects described in the above embodiment are achieved. In particular, employing a polygonal pillar portion engaging with the straight groove portion 311 in place of the cylindrical portion 411 facilitates the adjustment for example, though it slightly degrades adjustment accuracy.

Moreover, in this configuration the first lens cam follower 41 includes the first cylindrical portion 411, the second cylindrical portion 412 and a rotational operation portion (operation portion). The first cylindrical portion 411 and the second cylindrical portion 412 respectively engage with the straight groove portions and the cam groove portions and have central axes decentered from each other. The rotational operation portion whose rotation axis is the central axis of the first cylindrical portion is disposed between the straight guiding barrel and the straight movable barrel and is exposed outside the straight movable barrel. The operation portion enables an operation of rotating the first cylindrical portion 411 and the second cylindrical portion 412 from outside of the straight movable barrel 40. Furthermore, this configuration includes the coupling member to connect the cam followers and the straight movable barrel with each other. In this configuration, the position of the straight movable barrel 40 in the circumferential direction can be adjusted by moving the first cylindrical portion 411 about its rotation axis that is the cylinder central axis of the second cylindrical portion 412.

MODIFIED EXAMPLE 2

Although the above embodiment described the case where the exposed portion 415 of the first lens cam follower 41 includes a tool tab 415a and two tool holes 415b symmetric with respect to the positioning portion 414, alternative embodiments of the present invention are not limited thereto. For example, protruding bosses may be provided to the exposed portion 415 in place of the two tool holes 415b. The tool hole 415b may be only one.

MODIFIED EXAMPLE 3

Although the above embodiment described the case where the first lens cam followers 41 are used for a zoom mechanism including the straight movable barrel, alternative embodiments of the present invention are not limited thereto. For example, the first lens cam followers may be used for a focus mechanism. In addition, the number of the first lens cam followers 41 in the circumferential direction is not limited to three, but may be other than three, or one.

MODIFIED EXAMPLE 4

Although the above embodiment described the interchangeable lens to be used with the lens-interchangeable digital single-lens reflex camera, alternative embodiment of the present invention is also applicable to a lens apparatus provided integrally with a digital camera such as a lens-integrated digital still camera and a lens-integrated video camera.

The above embodiment and modified examples can provide a lens apparatus allowing adjustment to suppress change in tilt due to component variation caused by tolerance while having a configuration in which a straight movable barrel is disposed outside a straight guiding barrel and a cam barrel, and provide an optical apparatus including the lens apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-132527, filed on Jun. 25, 2013, and 2014-098547, filed on May 12, 2014 which are hereby incorporated by reference herein in their entirety.

What is claimed is:

1. A lens apparatus comprising:
   a straight guiding barrel having a straight groove portion;
   a cam barrel having a cam groove portion;
   a straight movable barrel disposed outside the straight guiding barrel and the cam barrel, and holding a lens, the straight movable barrel being movable in an optical axis direction by a relative movement of the straight guiding barrel and the cam barrel;
   a cam follower including:
     a first cylindrical portion and a second cylindrical portion that respectively engage with the straight groove portion and the cam groove portion, the first and second cylindrical portions having central axes decentered from each other, and
     an operation portion extending from one of the first or second cylindrical portion and allowing rotational operation of the first and second cylindrical portions from outside of the straight movable barrel; and
   a connecting member connecting the cam follower and the straight movable barrel with each other to pull the cam follower inside of the straight movable barrel, a central axis of the connecting member coinciding with a central axis of either the first cylindrical portion or the second cylindrical portion, wherein the operation portion is exposed outside of the straight movable barrel.

2. The lens apparatus according to claim 1, wherein the cam barrel is disposed outside the straight guiding barrel.

3. The lens apparatus according to claim 1, wherein the straight guiding barrel is disposed outside the cam barrel.

4. The lens apparatus according to claim 1, wherein the operation portion allows the rotational operation of the first cylindrical portion about a central axis of the second cylindrical portion to adjust a position of the straight movable barrel.

5. The lens apparatus according to claim 1, wherein the cam follower is plurally provided in a circumferential direction of the straight movable barrel.

6. The lens apparatus according to claim 1, wherein the cam follower is formed integrally with the first cylindrical portion, the second cylindrical portion, and the operation portion.

7. The lens apparatus according to claim 1, wherein the straight movable barrel includes a fixing portion and a hole portion into which the connecting member is inserted, the cam follower being fixed to the fixing portion.

8. The lens apparatus according to claim 1, wherein the connecting member is connected with at least one of the first and second cylindrical portions.

9. The lens apparatus according to claim 1, wherein the cam groove portion has a locus in which a positive and negative sign of its angle forming with the straight groove portion is inverted.

10. The lens apparatus according to claim 1, wherein an end of the operation portion extends beyond the straight movable barrel toward the cam barrel along a direction of the optical axis and is disposed outside the cam barrel and the straight guiding barrel.

11. An optical apparatus comprising:
a body; and
a lens apparatus housed in the body,
wherein the lens apparatus includes:
a straight guiding barrel having a straight groove portion;
a cam barrel having a cam groove portion;
a straight movable barrel disposed outside the straight guiding barrel and the cam barrel, and holding a lens, the straight movable barrel being movable in an optical axis direction by a relative movement of the straight guiding barrel and the cam barrel;
a cam follower including:
a first cylindrical portion and a second cylindrical portion that respectively engage with the straight groove portion and the cam groove portion, the first and second cylindrical portions having central axes decentered from each other, and
an operation portion extending from one of the first or second cylindrical portion and allowing rotational operation of the first and second cylindrical portions from outside of the straight movable barrel; and
a connecting member connecting the cam follower and the straight movable barrel with each other to pull the cam follower inside of the straight movable barrel, a central axis of the connecting member coinciding with a central axis of either the first cylindrical portion or the second cylindrical portion,
wherein the operation portion is exposed outside of the straight movable barrel.

12. A camera comprising:
a lens apparatus configured to cause light from an object to form an object image; and
an image sensor configured to photoelectrically convert the object image,
wherein the lens apparatus includes:
a straight guiding barrel having a straight groove portion;
a cam barrel having a cam groove portion;
a straight movable barrel disposed outside the straight guiding barrel and the cam barrel, and holding a lens, the straight movable barrel being movable in an optical axis direction by a relative movement of the straight guiding barrel and the cam barrel;
a cam follower including:
a first cylindrical portion and a second cylindrical portion that respectively engage with the straight groove portion and the cam groove portion, the first and second cylindrical portions having central axes decentered from each other, and
an operation portion extending from one of the first or second cylindrical portion and allowing rotational operation of the first and second cylindrical portions from outside of the straight movable barrel; and
a connecting member connecting the cam follower and the straight movable barrel with each other to pull the cam follower inside of the straight movable barrel, a central axis of the connecting member coinciding with a central axis of either the first cylindrical portion or the second cylindrical portion,
wherein the operation portion is exposed outside of the straight movable barrel.

13. A lens apparatus comprising:
a straight guiding barrel having a straight groove portion;
a cam barrel having a cam groove portion;
a straight movable barrel disposed outside the straight guiding barrel and the cam barrel, and holding a lens, the straight movable barrel being movable in an optical axis direction by a relative movement of the straight guiding barrel and the cam barrel;
a cam follower including:
a first cylindrical portion and a second cylindrical portion that respectively engage with the straight groove portion and the cam groove portion, the first and second cylindrical portions having central axes decentered from each other, and
an operation portion extending from one of the first or second cylindrical portion and allowing rotational operation of the first and second cylindrical portions from outside of the straight movable barrel; and
a connecting member connecting the cam follower and the straight movable barrel with each other,
wherein the operation portion provides for the adjustment of the straight moveable barrel to allow decentering adjustment, and
wherein an end of the operation portion extends beyond the straight movable barrel toward the cam barrel along a direction of the optical axis and is disposed outside the cam barrel and the straight guiding barrel.

* * * * *